Aug. 11, 1925.

A. WESTGARD

DADO CUTTER

Filed July 10, 1923  2 Sheets-Sheet 1

Witnesses
W. F. Kilroy
Harry R. L. White

Inventor:
Anton Westgard,
By Mason, Fenwick & Lawrence, Attys.

Aug. 11, 1925.
A. WESTGARD
DADO CUTTER
Filed July 10, 1923
1,549,036
2 Sheets-Sheet 2
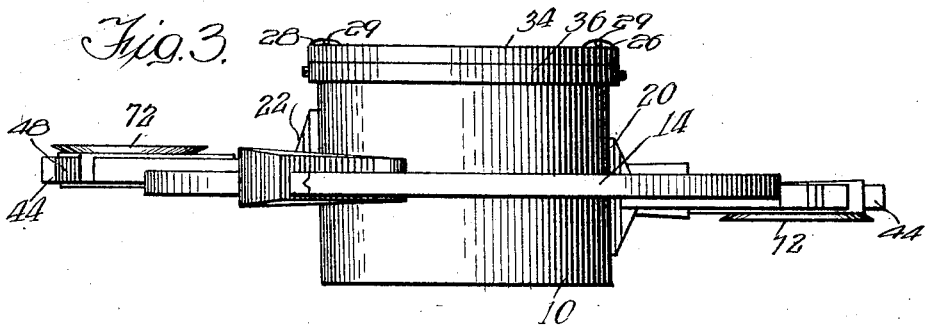
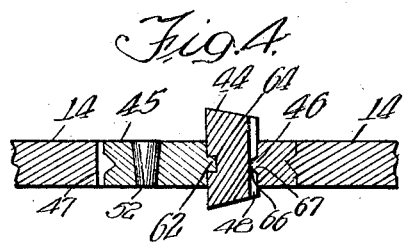
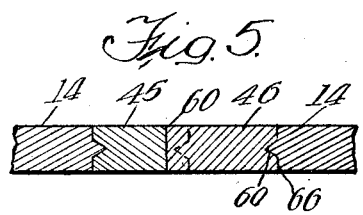
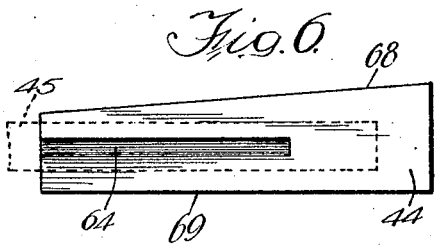
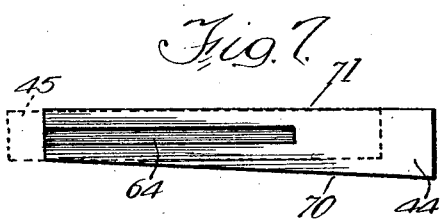
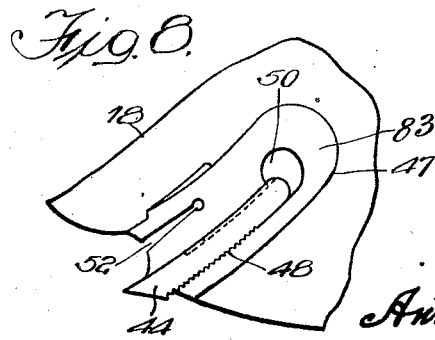
Witnesses:
W. F. Kilroy
Harry R. L. White
Inventor:
Anton Westgard,
By Mason, Fenwick & Lawrence, Attys.

Patented Aug. 11, 1925.

1,549,036

UNITED STATES PATENT OFFICE.

ANTON WESTGARD, OF CHICAGO, ILLINOIS.

DADO CUTTER.

Application filed July 10, 1923. Serial No. 650,696.

*To all whom it may concern:*

Be it known that I, ANTON WESTGARD, a citizen of the United States, residing at Chicago, in the county of Cook and State of Illinois, have invented certain new and useful Improvements in Dado Cutters; and I do hereby declare the following to be a full, clear, and exact description of the invention, such as will enable others skilled in the art to which it appertains to make and use the same.

This invention relates to improvements in dado cutters or circular saws for grooving or cutting wood, especially cross-grained, and the object thereof is to provide a novel cutter of this type and more particularly an improvement upon the construction shown and described in my prior application filed October 4, 1922, under Serial No. 592,437, the construction being such as to simplify, facilitate and render more economical the manufacture, assemblage and mounting of the cutting elements.

Another object of the invention is to provide a dado cutter or circular saw, the width of which is adjustable so that cuts or grooves of any desired width between certain limits may be readily made, the cutting elements being removable and adjustable so that the saw teeth and cutters may be made of high speed steel which will require less sharpening and not a great deal of care, while at the same time, rendering the cutter free from all objectionable vibrations so that true and accurate lines of cuts may be made at all times.

Still another and principal object of the invention is to provide novel holding means for mounting the saw teeth in position and to firmly hold them in the circular saw body or disc mainly by friction, while at the same time, permitting adjustment and replacement of the saw teeth or other cutters and the mounting and securing or holding means thereof, with facility.

Other and further improved objects of the invention will be apparent from the disclosures in the accompanying drawings and following specification.

The invention, in a preferred form, is illustrated in the drawings, and hereinafter more fully described.

Fig. 3 is an edge view of the complete device as shown in Fig. 1.

Figure 1:
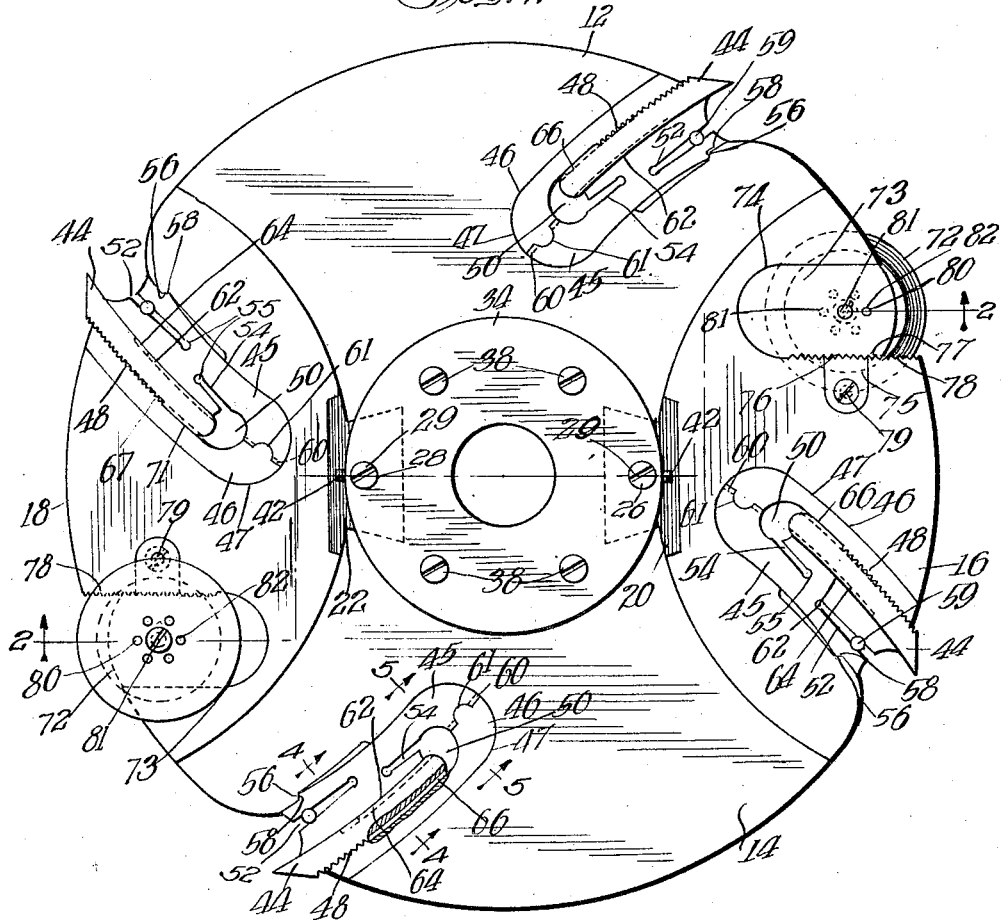
Fig. 1 is a side elevation of the novel dado cutter or circular saw of this invention.

Figs. 4 and 5 are enlarged detail sectional views taken on the section lines 4—4 and 5—5 of Fig. 1, and looking in the direction indicated by the arrows.

Figs. 6 and 7 are longitudinal elevations of two different forms or widths of saw teeth showing in dotted lines their application to the saw.

Fig. 8 is a fragmentary side elevation, showing a modification of the mounting means for the cutter tooth.

Referring to the drawings in detail:

Reference numeral 10 indicates the hub of the dado cutter or circular saw, which is adapted to be positioned upon or fixed to a revolving shaft to rotate thereon or therewith in any well known or obvious manner in the art. Integral with the hub 10 are two segments 12 and 14 which form a part of the body or disc of the saw proper. As best shown in Fig. 1, these extensions 12 and 14 are bounded by curved lines forming segments of a continuous circle which is cut off to permit of the positioning into cooperative relation therewith of additional members 16 and 18, which, as best shown in Fig. 1, complete the circle of the saw disc. These members 16 and 18 are of a thickness to correspond approximately to the thickness of the integral members 12 and 14, but instead of being integral with the hub 10 are slidably positioned thereon so as to be movable longitudinally with respect thereto. This is accomplished by means of lugs or extensions 20 and 22 integral with the members 16 and 18 respectively, and fitting slidably in dovetailed grooves formed in the sides or extensions of the hub or bearing sleeve 10.

In order to maintain the auxiliary disc segments 16 and 18 in desired relation to the original disc members 12 and 14 and in proper longitudinal position on the hub 10 to regulate the width of the cut desired, adjusting screws 26 and 28 are provided having the greater portions of the lengths thereof screw threaded substantially to one end and engaged in corresponding screw threaded openings in the lugs or extensions 20 and 22. These screws are rotatably mounted at one end of the hub, against endwise movement, and provided with means such as slots 29 for the insertion of a screw driver or the like by means of which they may be turned to adjust the cutters with respect to the hub 10, as will be hereinafter more fully set forth. For this purpose, the screws are provided with collars 30 and 32 shown in the form of enlargements near the upper ends thereof. A pair of annular plates 34 and 36 are secured against one end of the hub as by screws 38, the central openings of the plates aligning with and corresponding in size to the bore of the hub. These plates have diametrically opposed aligned openings 39 near the peripheral edges thereof aligned with the threaded openings of the lugs 20 and 22 and rotatably receive the adjusting screws 26 and 28 at their unthreaded ends. The collars 30 and 32 are held between the plates, being received in enlargements or counter bores 40 of the openings in the plate 34, at its inner face against which the plate 36 is disposed to permit the screws to be turned but to hold them against longitudinal or axial movement so that when the screws are turned in the threaded openings of the lugs 20 and 22, the latter, together with the segments 16 and 18 will be moved longitudinally of the hub. The screws may be held against rotation in any desired position of adjustment of the auxiliary disc members 16 and 18 by means of set screws 42 threaded through the peripheral edges of the plate 36 and engaging the unthreaded portions of the set screws to securely lock then in any desired position. It will thus be seen that by means of the operation of the adjusting screws 26 and 28, the relation of the auxiliary disc segments 16 and 18 of the body with respect to the hub 10 and the disc segments 12 and 14 may be varied as desired in order to obtain a variation, i. e., a narrower or wider cut in the material operated on. The fit of the members 20 and 22 in the dove tailed grooves in the hub 10, together with the relation to the adjusting screws 26 and 28 is such that there is no possibility of their becoming loose or vibrating while in use, and the cut will be true.

Each of the disc segments, 12, 14, 16 and 18 is provided with a saw tooth 44, as seen in Fig. 1, which saw tooth is preferably composed of some high speed metal and is removably and adjustably mounted in a holding means positioned in a recess in and opening from the periphery of the disc body so as to project from the peripheral edge of the body at its operative end. A simple and novel means is provided for this purpose constituting the primary subject matter of this application in conjunction with the adjusting means heretofore described.

This saw tooth mounting and holding means is adapted to be retained in position and to firmly hold the saw tooth in the circular saw body, principally by means of friction and in the form shown in Figs. 1 to 7, inclusive, consists of two sections, 45 and 46, adapted to spring into recesses or openings 47 in the disc segments through their periphery and to be firmly retained therein.

The inner side of section 46 is serrated as shown at 48 to receive the serrated edge of the tooth member 44 and by this meshing engagement, to permit adjustment of the degree of projection of the tooth at its operative end to any desired nicety of degree necessary. The section 45 is slotted longitudinally from its outer end and from an opening 50 formed by and between coacting recesses in the inner edge of the sections 45 and 46 but spaced from the inner end of the holder and inner end of the slot, which receives the tooth 44 as shown at 52 and 54, respectively, the inner terminals of the slots preferably having circular enlargements 55. This permits the member 45 to contract so that when the two members 45 and 46 are united after the tooth member 44 has been placed between them, the same may be sprung into the opening 47 of the circular saw and firmly held by friction. In this connection, the recess or opening 47 is provided with an inwardly facing shoulder 56 and the section 45 has a beveled projection 58 designed to spring behind the shoulder and retain the holding means in position. If desired, a pin 59 may be driven into the section 45 at the slot 52 after the tooth holding sections 45 and 46 have been sprung into the proper position in the circular saw, to expand the portions of this section on opposite sides of the slot near the outer end, where such friction is necessary, but it is to be understood that any other additional means may be provided for this purpose than that shown and described, especially in conjunction with sections which are sprung into position and held by means of friction.

In the construction of the sections, the section 46 is preferably provided with a V-shaped or other form of tongue 60 that enters a V-shaped or other correspondingly shaped groove 61 in the section 45 to prevent lateral movement between the sections, as more especially shown in Figs. 4 and 5 in the drawings, but it should be understood that any other suitable means may be provided for this purpose. The section 45 is also provided with a tongue 62 which enters a groove 64 in the edge of the tooth 44 opposed to the serrated edge and the tooth is preferably provided with a V-shaped groove 66 which receives a V-shaped tongue 67 of the section 46. In Figs. 4 and 5 of the drawings, the manner in which these sections fit together to prevent lateral displacement thereof, is clearly shown. The saw tooth 44 may be made of different widths as is also clearly shown in these views and in Figs. 6 and 7. The tooth may be made with a beveled side 68 positioned to project at one side of the disc, as well as at its straight side 69, the tooth in this form being relatively wide. In Fig. 7 the beveled side 70 merges with the one face of the disc or body of the cutter and the opposite side 71 is contiguous with the other face of the disc. This permits a variation in the width of the cut and also insures that the cutter will operate without undue friction or objectionable vibration, so that true and accurate lines of cuts may be made at all times.

The construction of the saw tooth and the means for retaining the same in position has been fully described in my Letters Patent No. 1,458,671 on saw construction, and further details of construction will be omitted here.

The angular relation of the saw tooth 44 to the plane of the disc segments 12, 14, 16 and 18 is such that the teeth dress longitudinally right and left, to a slight degree, as best shown in Figs. 6 and 7. This provides for a more accurate and efficient action of the saw itself, and prevents any undue friction, burning, binding or objectionable vibration which might otherwise be present and eliminates setting or swaging each tooth which would otherwise be necessary, practically after every filing.

Cooperating with the saw tooth and preferably mounted on the movable disc segments 16 and 18 are circular cutting members 72 rotatably mounted on plates 73, adapted to be fitted in corresponding sockets in the disc segments 16 and 18, as shown at 74. These plates are removably and adjustably positioned in the segments by means of attaching members 75, which are set in recesses in the segments and provided with serrated edges 76 engaging corresponding serrated edges 77 of the plates 73, which latter is also designed to engage the serrated edge 78 of the wall of the slot or recess. The attaching members 75 are held in position as by means of screws 79 as described in my copending application Serial No. 592,437, above referred to.

It may also be pointed out that the circular cutting members 72 are provided with a series of openings 80 extending around the center and adjacent to the inner portion thereof to receive screws 81 carried by each plate, whereby the cutting members are rotatably but positively mounted in their corresponding attaching means, and in addition the pin 82 passes through one of the openings 80 into a corresponding opening of the member 73, so that by turning the discs the relation of the edge of the cutting discs 72 may be adjusted and fixed in adjusted position with relation to the edge of the saw or circular segments 16 and 18. This provides for the renewal of the cutting edge of the circular disc 72 whenever the same becomes dull, without necessitating its removal and the new edge can be presented merely by removing the screw 81 and pin 82, and inserting the pin in a new hole 80.

Figure 2:
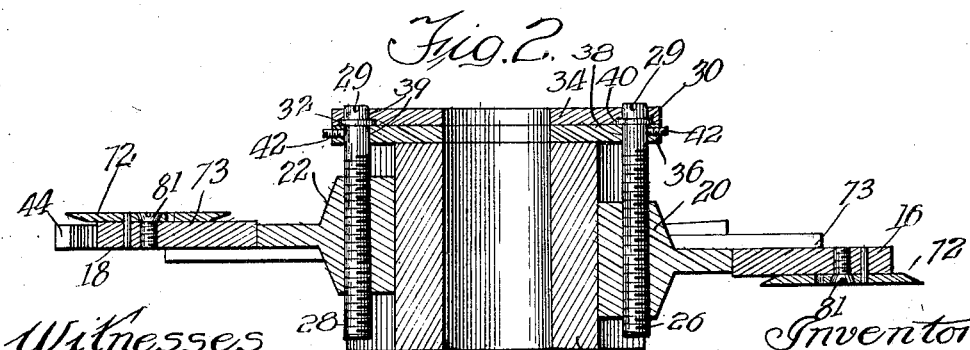
Fig. 2 is a diametrical sectional view, taken on the staggered section line 2—2 of Fig. 1.

As will be seen, the radial relation of both the teeth and the cutting members 68 and 72 can be adjusted relatively to the saw edge so that as the same becomes worn down through use or continuous sharpening, adjustment may be made whereby new cutting edges may be presented without necessitating the renewal of these parts. Herein is provided a saw which will have a particularly long life, as the cutting member can be readily sharpened and renewed when worn out, leaving the body of the saw as an original element, which can be used with a very great number of successive cutting members, as contrasted with the ordinary disc saws now on the market, which become useless and must be discarded at great expense, after a comparatively short period of time. Further, the effective cutting width of the saw may be varied as desired to quite a considerable degree, as shown in Fig. 2, as the segment 16 may be lowered to the limit of movement of the screws 26 and 28 and the opposite segment 18 may be raised to the other limit of movement of the screw 28, and vice versa, whereby a particularly wide cut may be attained.

In Fig. 8 of the drawings, a modification of the tooth holder is shown in which the entire holder 83 is made in one piece and simply sprung into the circular saw and held in place by friction, as heretofore described, instead of being made in two pieces. The construction of this holder is the same as the form already described, except that it is made in one piece of spring metal and the slot 54 is omitted, and therefore further description of this particular form is deemed unnecessary.

I am aware that many changes may be made, and numerous details of construction varied throughout a wide range, without departing from the principles of this invention, and I, therefore, do not purpose limiting the patent granted hereon otherwise than necessitated by the prior art.

I claim as my invention.

1. In a dado cutter having a body with a peripheral recess, a cutter member, and a holder, said holder having a slot adapted to receive the cutter member and engage opposite faces thereof, and a second slot substantially parallel with but spaced from the cutter receiving slot, said holder adapted to be sprung into the peripheral recess.

2. The structure specified in claim 1, with one face of the cutter receiving slot provided with transverse serrations and one face of the cutter adapted to contact with said serrated face of the slot provided with complementary serrations.

3. In a dado cutter having a body with a peripheral recess, a cutter member and a holder, said holder adapted to seat in said peripheral recess and having a slot adapted to seat and engage opposite faces of the cutter and further provided with oppositely disposed slots extending in substantial alignment, parallel with, but spaced from the cutter receiving slot.

4. The structure specified in claim 1 with means cooperating with the second mentioned slot to secure same in expanded position.

In testimony whereof I affix my signature.

ANTON WESTGARD.